US008161527B2

(12) United States Patent
Curren

(10) Patent No.: US 8,161,527 B2
(45) Date of Patent: Apr. 17, 2012

(54) SECURITY ENHANCED DATA PLATFORM

(76) Inventor: Edward Curren, Woodbridge, VA (US)

(*) Notice: Subject to any disclaimer, the term of this patent is extended or adjusted under 35 U.S.C. 154(b) by 756 days.

(21) Appl. No.: 12/358,410

(22) Filed: Jan. 23, 2009

(65) Prior Publication Data

US 2010/0189251 A1   Jul. 29, 2010

(51) Int. Cl.
*G06F 17/30* (2006.01)
*G06F 12/14* (2006.01)
(52) U.S. Cl. .......... 726/2; 726/21; 726/26; 726/27; 726/28; 726/29; 713/164; 713/182; 713/184
(58) Field of Classification Search ............. 380/28
See application file for complete search history.

(56) References Cited

U.S. PATENT DOCUMENTS

| | | | | |
|---|---|---|---|---|
| 5,491,752 A * | 2/1996 | Kaufman et al. | ............... | 380/30 |
| 5,719,941 A * | 2/1998 | Swift et al. | .................... | 713/155 |
| 6,370,250 B1 * | 4/2002 | Stein | ............................. | 380/281 |
| 7,565,702 B2 * | 7/2009 | Jakubowski et al. | ............ | 726/28 |
| 7,603,556 B2 * | 10/2009 | Brown et al. | ................. | 713/169 |
| 7,685,430 B1 * | 3/2010 | Masurkar | ....................... | 713/182 |
| 7,970,143 B2 * | 6/2011 | Vennelakanti et al. | ........ | 380/277 |
| 2001/0002487 A1 * | 5/2001 | Grawrock et al. | ............ | 713/193 |
| 2003/0033545 A1 * | 2/2003 | Wenisch et al. | ............... | 713/202 |
| 2003/0221115 A1 * | 11/2003 | Itoh et al. | ....................... | 713/189 |
| 2005/0250473 A1 * | 11/2005 | Brown et al. | ................. | 455/411 |
| 2006/0018484 A1 * | 1/2006 | Yoshihiro et al. | ............. | 380/277 |
| 2006/0041759 A1 * | 2/2006 | Kaliski et al. | .................. | 713/184 |
| 2006/0112420 A1 * | 5/2006 | Challener et al. | .................. | 726/5 |
| 2007/0174909 A1 * | 7/2007 | Burchett et al. | ................. | 726/18 |
| 2008/0127354 A1 * | 5/2008 | Carpenter et al. | .............. | 726/28 |
| 2008/0155276 A1 * | 6/2008 | Chen et al. | .................... | 713/193 |
| 2008/0209221 A1 * | 8/2008 | Vennelakanti et al. | ........ | 713/183 |
| 2008/0212781 A1 * | 9/2008 | Vennelakanti et al. | ........ | 380/277 |
| 2008/0232598 A1 * | 9/2008 | Vennelakanti et al. | ........ | 380/279 |
| 2009/0240943 A1 * | 9/2009 | Brown et al. | ................. | 713/171 |
| 2010/0058067 A1 * | 3/2010 | Schneider | ...................... | 713/184 |
| 2011/0126024 A1 * | 5/2011 | Beatson et al. | ............... | 713/186 |

OTHER PUBLICATIONS

Vimercati et al., "Access Control: Principles and Solutions," John Viley & Sons, Ltd., 2003, pp. 397-420.*
Gonzalez-Campos, "Secrure Groups: Enhanced Management of Encrypted Data in Databases," IEEE, 2006, pp. 1-7.*
Humphrey et al., "Security for Grids," Proceeding of the IEEE, vol. 93, Nol. 3, Mar. 2005, pp. 644-650.*
Gettler et al., "The DCE Security Service," Hewlett-Packard Journal, Dec. 1995, pp. 41-49.*
Eugene Schultz, "Windows 2000 Security: A Postmortem Analysis," University of California-Berkeley Lab, 2003, pp. 1-4.*

* cited by examiner

*Primary Examiner* — Luu Pham
(74) *Attorney, Agent, or Firm* — White-Welker & Welker, LLC; Matthew T. Welker, Esq.

(57) ABSTRACT

The security enhanced data platform is comprised of two primary subsystems and a host of supporting subsystems. The first primary subsystem is a document management system. A set of client side tools provides the user a way to specify classifications and compartments for selected areas of a document, and a way to save the document in the format required by the system in order to allow the system to enforce the rules and privileges dictated to the system. The second subsystem is a security enhanced database management system. In documents the system allows different user privilege requirements on the document as a whole as well as on pages, paragraphs, sentences, words, and/or letters of a word. A history of document changes is maintained to provide an audit trail after the fact of who did what changes, where those changes were made and when those changes were made.

18 Claims, 9 Drawing Sheets

SECURITY ENHANCED DATA PLATFORM

FEDERALLY SPONSORED RESEARCH

Not Applicable

SEQUENCE LISTING OR PROGRAM

Not Applicable

CROSS REFERENCE TO RELATED APPLICATIONS

Not Applicable

TECHNICAL FIELD OF THE INVENTION

The present invention relates generally to a data management system. More specifically the present invention relates to a data management system providing control of data that extends beyond the database into all forms of documents and communications.

BACKGROUND OF THE INVENTION

Access to data is becoming ever more conditional and retention and disposal of data is becoming ever more regulated. This spans the gamut of government agencies and private industries. Today's technology does not have a turnkey solution to deal with the infinite number of privileges, clearances, and conditions placed on a blob of data. Solutions must be implemented by the end user, and in many cases must be done manually on a datum by datum basis. Such solutions are exemplified in both document redaction techniques and the fact that there are entire departments dedicated to implementation of document retention policies. Those solutions that are automated are typically implemented in a computing space that is not secure, or more commonly programmed without regard to security factors because of time constraints, ignorance, or perceived effort level and cost.

Access control of information based on user permissions is a fundamental part of most computer software. Microsoft Windows, for example, uses access control lists (ACLs) to control which users can access files and folders on the computer. Most databases enforce access controls on the server login, databases, and on objects within a database (such as tables). In both cases, the level at which information is controlled extends only to a certain level of granularity. Windows controls access to user files, but not to portions of user files. RDBMSs control access to tables but does not provide row-level or cell-level security within tables.

In some scenarios, however, there is a requirement to control access at a more granular level. A list of patients and diagnoses, for example, may be stored in a single file or table. Any one doctor, however, may only be permitted to review information related to their own patients. In such a case, merely setting an ACL on a file or issuing a GRANT/DENY SELECT on a table will not meet the business requirements. Similar scenarios exist in many environments, including finance, law, government, and military applications and consumer privacy requirements.

The typical approach to meeting such requirements in database applications has been to implement the necessary logic in application code. The business logic layer of an n-tier application might apply the filtering, for example. Or, in a two-tier client-server application, the client might do it. This approach may be effective for the application, but the data is not actually secured. A user connecting to the back-end database with a SQL query tool will have unrestricted access to all rows in tables on which they have SELECT permission.

Another common approach, which mitigates the last issue mentioned, is to wrap all data access in stored procedures. Users are denied all permissions on the underlying tables, and are instead given execute permissions on the stored procedures that implement the filtering logic. This approach has its own drawbacks. For example, ad hoc user reporting against such a database is difficult or impossible.

Such filtering as mentioned above is impossible for files. Access control to files on a computer up until now has been either all or nothing, or at best sometimes the option of read-only restrictions versus editing of the document.

From the database point of view, what is needed is a way to present the actual tables (or views) to user accounts with the filtering logic applied quickly, accurately, and automatically from within the database itself, based on the user. In this case, all users might have access to the Patient table but, for each user, "SELECT*FROM Patient" returns only the data that user should see.

The need for such granular control of data extends well beyond the database into all forms of documents and communications. In the wake of Enron and Arthur Anderson document retention has not only been increasingly scrutinized by the government and investors, but also extended beyond paper documents to include electronic documents and particularly email. There exists significant value in developing an email server that can be integrated with the security features and document retention policies of the data security server.

In the government intelligence community, data materials are organized by classification and compartment. Classification falls into 1 of 4 categories which are Unclassified, Confidential, Secret, and Top Secret. To further complicate matters users with Top Secret clearance are granted access to Secret, Confidential and Unclassified materials, however the same is not true in reverse. Users with confidential clearance do not have access secret or top-secret materials. Some material is further organized by compartment meaning that a user must have explicit authorization for access to the material in that compartment regardless of their classification authorization. The government classifies data by the degree of harm caused to the security and the citizens of the United States if that data were given to an adversary. Needless to say, the protection of this data must be taken very seriously.

The intelligence community is far from the only place where such data is secured and access authorization is required. Many sectors of business are just as concerned and just as liable for the consequences should data access be gained by someone without authorization. In healthcare, for example, privacy and access to patients' records is becoming increasingly more regulated.

Companies spend millions of dollars on research and development of new products. That research and the trade secrets that come from the research must be guarded and protected to prevent competitors from taking that research and using it against the company that spent the time and money developing the idea.

One of the primary products of law firms is documents. These documents range from wills to contracts to evidence. Unauthorized access to such documents or alteration of such documents can have devastating effects on individuals, and as such must be given a high degree of protection as well as requiring absolute authentication of a user's identity.

SUMMARY OF THE INVENTION

The security enhanced data platform of the present invention starts with customizing the Linux kernel. Security is enhanced, core utilities are modified, and the enhanced access control system is built. The core Linux access control functionality in the kernel and core utilities is replaced by a multi-level access control system. As part of the operating system the ML-ACL will be more secure and run much faster than it would as an application on top of Linux.

The initial compliment of security enhanced applications that will be built for the security enhanced data platform include a Database Management System (DBMS), document management system, business process and workflow engine, and a email, messaging and collaboration server.

The Database Management System (DBMS) will be integrated with the operating system's enhanced ML-ACL.

The document management system will provide a collaborative environment for personnel of differing authorization levels to: construct, edit and view documents; keep detailed logs of who did what to which document and when it happened; retain versions of documents as they are created and edited; integrated scanning and OCR functionality; and optional full text indexing.

Also built into the document management system is the document retention policy engine. The document retention policy engine automates the task of complying with the enterprise's official document retention policies as guided by federal laws and the specific needs of the industry and the enterprise. All activity within the system is monitored and recorded, including changes made on documents. All changes of a document are recorded and available for audit.

Within the system, the granularity of control over data is very fine. In documents the system will allow you to have different user privilege requirements on the document as a whole as well as on pages, paragraphs, sentences, words, and/or letters of a word. The system will automatically redact, the data for which the user does not have privileges as well as enforcing granular control of what users may edit, delete, create, or alter.

Data in the database can be secured on the database as a whole, the tables in the database, the columns in the table, the rows in a table, and/or the individual cells (a specific row and column) of a database table. A history of document changes is maintained to provide an audit trail after the fact of who did what changes, where those changes were made and when those changes were made.

To maintain integrity of the data and audit trail users are authenticated by account username and password login, however for those environments where accurate user authentication of a user is of higher concern, the system provides a two-factor authentication system with which to allow users to login.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
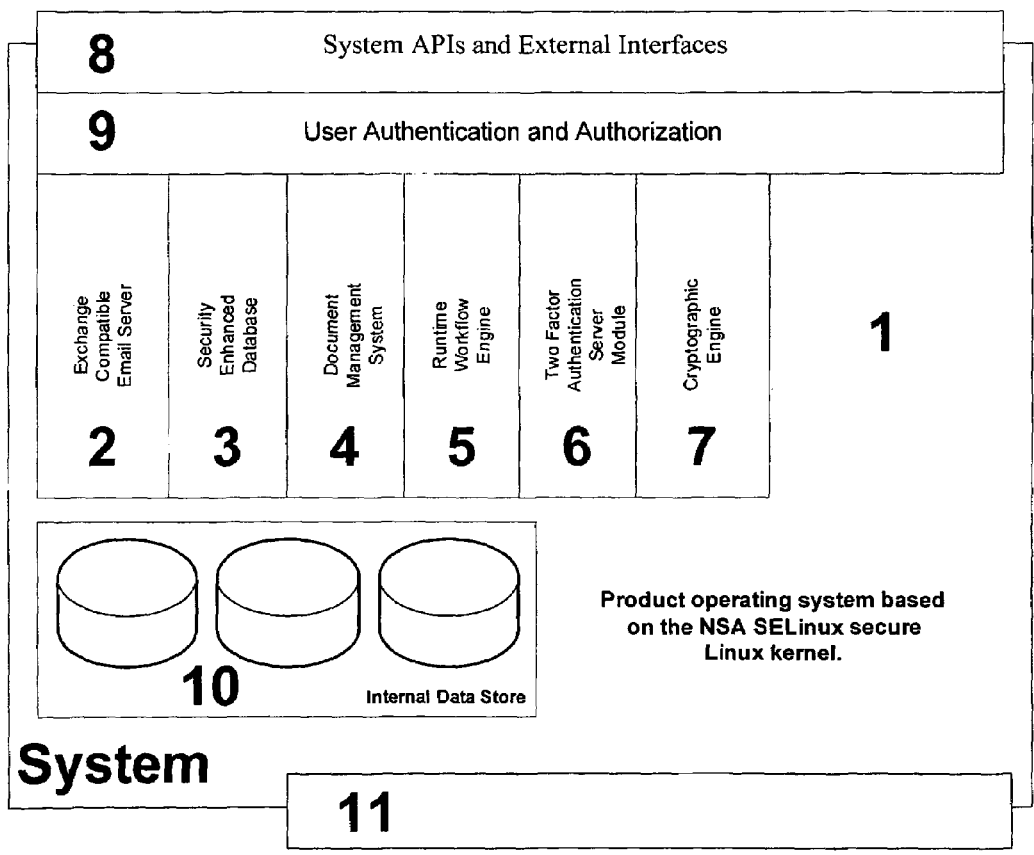
FIG. 1 is a conceptual view of the system design of the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is therefore, not to be taken in a limiting sense, and the scope of the present invention is defined only by the appended claims.

The security enhanced data platform of the present invention starts with customizing the Linux kernel. Security is enhanced, core utilities are modified, and the enhanced access control system is built. The core Linux access control functionality in the kernel and core utilities are replaced by the multi-level access control system. As part of the operating system the ML-ACL will be more secure and run much faster than it would as an application on top of Linux.

The initial compliment of security enhanced applications that will be built for the security enhanced data platform include a Database Management System (DBMS), document management system, business process and workflow engine, and a email, messaging and collaboration server.

The Database Management System (DBMS) will be integrated with the operating system's enhanced ML-ACL.

The document management system will provide a collaborative environment for personnel of differing authorization levels to: construct, edit and view documents; keep detailed logs of who did what to which document and when it happened; retain versions of documents as they are created and edited; integrated scanning and OCR functionality; and optional full text indexing.

Also built into the document management system is the document retention policy engine. The document retention policy engine automates the task of complying with the enterprise's official document retention policies as guided by federal laws and the specific needs of the industry and the enterprise. All activity within the system is monitored and recorded, including changes made on documents. All changes of a document are recorded and available for audit.

Within the system, the granularity of control over data is very fine. In documents the system will allow you to have different user privilege requirements on the document as a whole as well as on pages, paragraphs, sentences, words, and/or letters of a word. (It is not practical to put privilege requirements on letters of a word, but the system will let you). The system will automatically redact, (black out and remove), the data for which the user does not have privileges as well as enforcing granular control of what users may edit, delete, create, or alter.

Data in the database can be secured on the database as a whole, the tables in the database, the columns in the table, the rows in a table, and/or the individual cells (a specific row and column) of a database table. Again these security descriptors also define what operations the user is allowed to perform on each of these pieces of data.

A history of document changes is maintained to provide an audit trail after the fact of who did what changes, where those changes were made and when those changes were made.

To maintain integrity of the data and audit trail users are authenticated by account username and password login, however for those environments where accurate user authentication of a user is of higher concern, the system provides a two-factor authentication system with which to allow users to login. An example of a two-factor authentication system is RSA's SecureId. The Two Factor Authentication system implemented in this system, however does not require purchase, distribution, maintenance or administration of key FOBs, but rather makes use of client's existing cell phones or PDAs to act as the FOB. Details on how this works are specified later in this document. A key Fob is a security token (or sometimes a hardware token, hard token, authentication token, cryptographic token, or key fob) may be a physical device that an authorized user of computer services is given to ease authentication. The term may also refer to software tokens.

For those environments that have large growth of data or require high availability of their systems, or both, the system is expandable in two primary ways.

First, for storage, additional storage media, (hard drives, optical re-writeable drives, etc) may be added to the system whether they are added internally, added via SAN/NAS, or added via some other connection, and the system will incorporate the new storage media into the capacity of the system's overall data storage, (hot swap storage and on the fly addition of capacity). The servers are also cluster enabled for high availability environments and load balancing. High-availability clusters (also known as failover clusters) are implemented primarily for the purpose of improving the availability of services which the cluster provides.

If the servers are cluster enabled, they operate by having redundant nodes, which are then used to provide service when system components fail. HA cluster implementations attempt to manage the redundancy inherent in a cluster to eliminate single points of failure. Load-balancing clusters operate by distributing a workload evenly over multiple back end nodes. Typically the cluster will be configured with multiple redundant load-balancing front ends.

Now referring to FIG. 1, the system design of the present invention is illustrated. The operating system 1 for the present invention is based upon a secured Linux kernel known as SELinux which is provided by the US NSA. The Email and Messaging Server 2 serves as the host for sending and receiving messages such as email, NNTP news items, RSS feeds and instant messaging. This will allow automation of email retention in compliance with the document retention policies setup by the end user. A Security Enhanced DBMS 3 offers native enhanced security by enforcing privileges specified by the User Authentication and Authorization Subsystem 9.

The document management system 4 can be thought of as a secondary file system that is laid on top of the Linux file system. The DMS 4 file system enables two additional, but critical, file system functions. First it adds version control of the document collection. This enables the system to keep all revisions of a document as well as who made the revisions and when they were made. The second adds the ability to separate document data from document metadata and thus allows strongly encrypted documents to be stored and the information about those documents to be stored in a database allowing for quick look up and access of secured documents.

A Runtime Workflow Engine 5 is simply one of any number of open source or commercial Business Process Engineering and Management systems with a customized designer on the front end that will be used to route documents and data through a user defined approval process for actions on the documents or data.

A secure two factor authentication sub-system (STFAS) 6 is designed to add an additional authentication mechanism to augment what you know—i.e. a username and password—along with what you have—i.e. a device that provides a one-time password that can be used to log into the system.

A cryptographic engine 7 plays a central role in the system. It is responsible for data protection, data authentication, user authentication and vetting, and communications protection and authentication.

System APIs and External Interfaces 8 enable native applications and external systems and applications to make use of the overall system and its subsystems in a secure managed way. Because the primary focus of the present invention is to maintain the integrity of the documents and data contained within the system, methods for positively identifying the user are critical. Once the identity of the user has been ascertained, enforcement of the system's privileges and restrictions must be absolute. The system enables such authentication and authorization with a set of tools that can be configured by the system administrator(s). Configurable password requirements including minimum length, required usage of capital and/or lower case letters, numbers, and symbols. Optional required usage of the Two Factor Authentication subsystem 9. User rights authorization of any combination of requirements set out by system administrators via the authorization subsystem 9.

Internal data storage 10 is encrypted before writing to disk. This ensures that if a physical loss of the system occurs that the data will remain secure and unusable. As part of the encrypted file system, new disks or other storage media added to the system will be enveloped and made to be part of the logical file system enhancing the overall systems storage capacity via an External Storage Expansion Interface 11.

The secure two factor authentication sub-system (STFAS) 9 is designed to add an additional authentication mechanism to augment what you know—i.e. a username and password—along with what you have—i.e. a device that provides a one-time password that can be used to log into the system. Current systems require purchase and maintenance of a key "FOB"—a device that produces a number based upon an algorithm and time synchronization with the server. STFAS 9 makes use of a client's existing cell phone or PDA to produce the one-time passwords securely without relying on the synchronization of two clocks.

Figure 2:
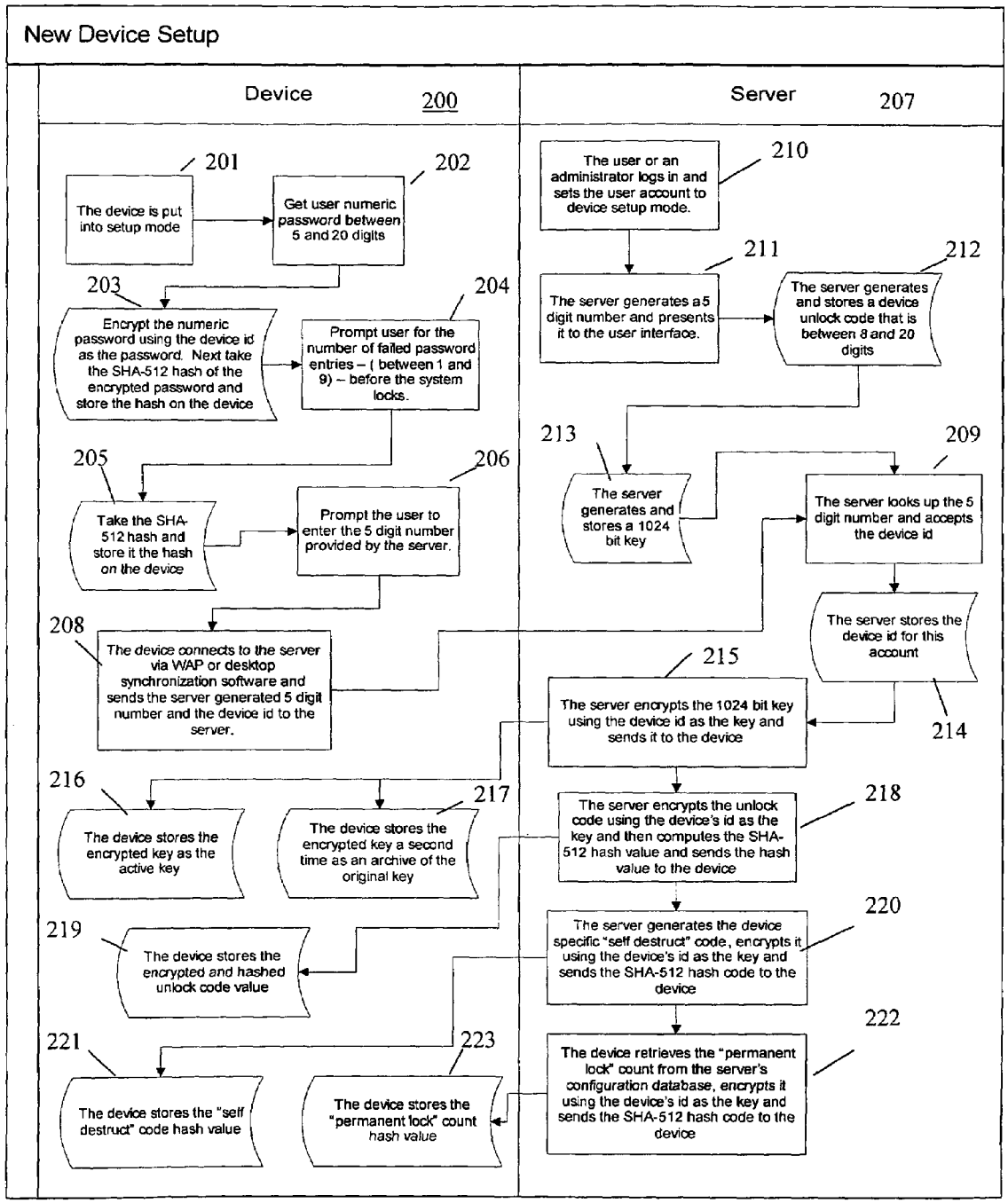
FIG. 2 is a flow chart illustrating New Device Setup Flowchart of the two-factor authentication system of the present invention.
Figure 3:
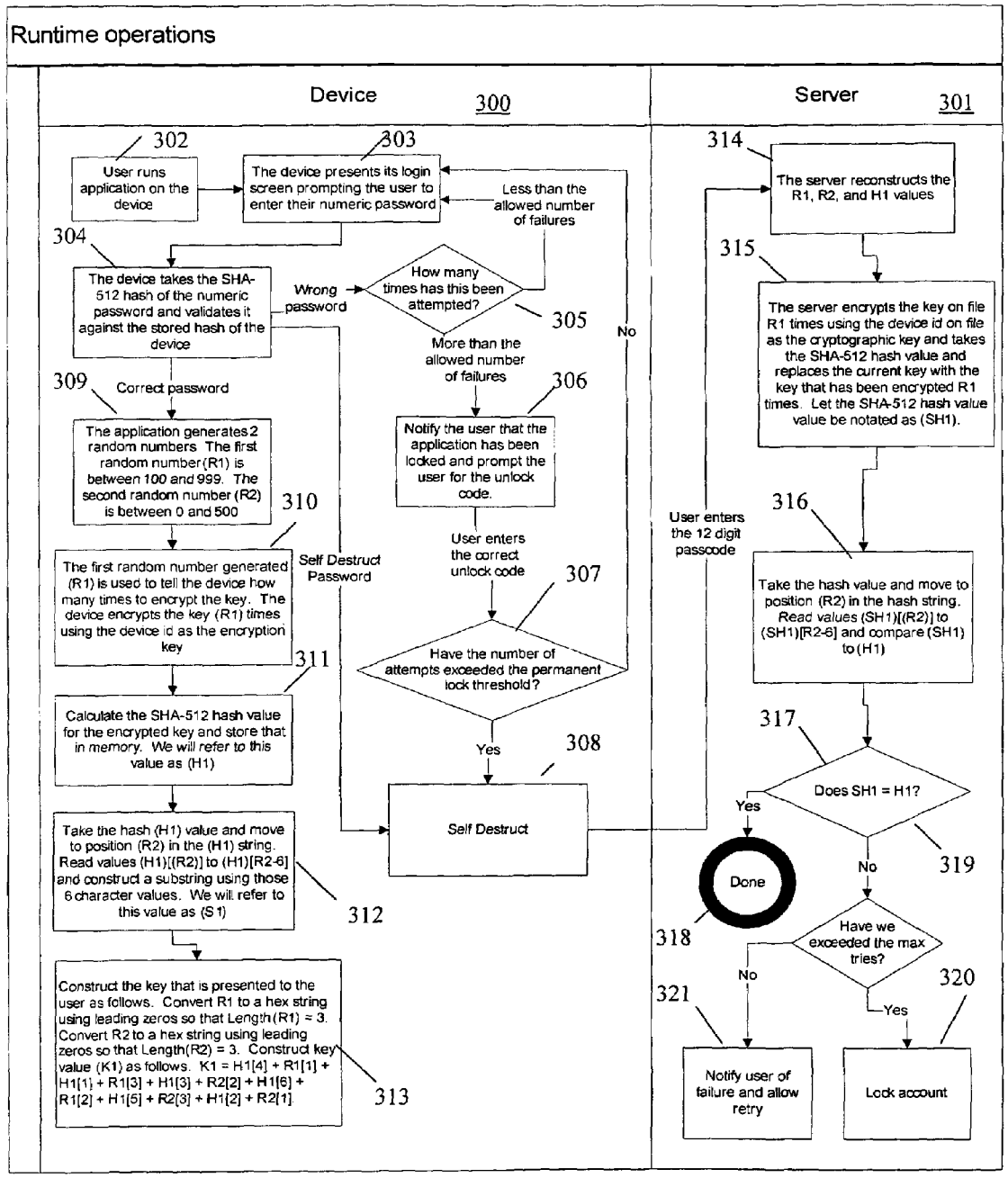
FIG. 3 is a flow chart illustrating Runtime Operations Flowchart of the two-factor authentication system of the present invention.
Figure 4:
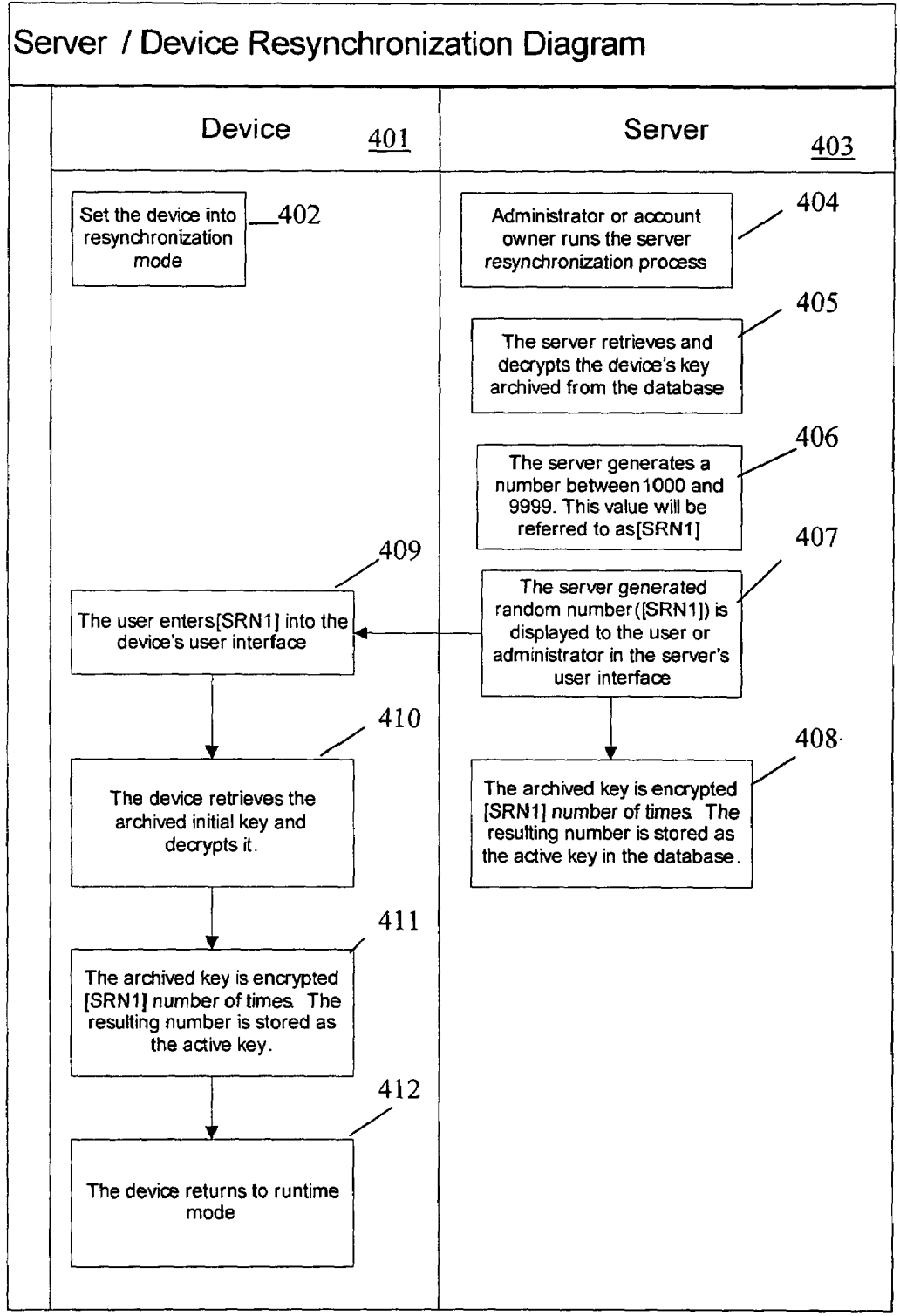
FIG. 4 is a flow chart illustrating Device Resynchronization Flowchart of the two-factor authentication system of the present invention.

As outlined in FIGS. 2-4 the process involves encrypting a key repeatedly for a predetermined number of cycles, then taking a cryptographic one-way hash of that key and presenting a selected set of characters from that hash. Referring to FIG. 2, the new device setup flow chart is illustrated. First a user or an administrator logs in and sets up a user account on the server 207 and places the account in a device set up mode 210. The server 207 generates a five-digit number and presents it to the user interface 211. The server 207 generates and stores a device unlock code that is between eight and twenty digits 212 and also generates and stores a 1024 bit key 213.

Next, client software for a specific device is installed on an existing user owned device. Once the software is installed the software on the device 200 is placed into a setup mode 201. The user then inputs a numeric password between five and twenty digits 202. The password is encrypted using the device id as the password and the SHA-512 hash component of the encrypted password is stored on the device 203. Next the user is prompted for the number of failed password entries before the system locks 204. The SHA-512 hash component of the encrypted password is stored again 205 on the device 200, prompting the user to enter the five digit number 206 provided by the server 207 into the device 200. The device 200 connects to the server 207 via WAP or desktop synchronization software and sends the server 207 the server generated five digit number and the device ID 208 to the server 207. The server looks up the five-digit number and accepts the device ID 209.

Upon acceptance of the five-digit number 209, the server 207 stores the device id for the account 214. The server 207 encrypts the 1024 bit key using the device id as the key and sends it 215 to the device 200. The device 200 stores the encrypted key as the active key 216 and as an archive of the original key 217. The server 207 then encrypts the unlock code using the device's id as the key and then computes the SHA-512 hash value and sends the hash value to the device 218. The device 200 stores the encrypted and hashed unlock code value 219. The server 207 then generates the device specific "self destruct" code, encrypts it using the device's id as the key and sends the SHA-512 hash code to the device 220. Upon receipt, the device 200 stores the "self destruct" code hash value 221. Finally, the device retrieves the permanent lock count from the server's configuration database, encrypts it using the device's id as the key and sends the SHA-512 hash code to the device 222 and the device 200 stores the permanent lock count hash value 223.

Now referring to FIG. 3, the runtime operations flow chart of the present invention for the device 300 and server 301 is illustrated. A user first runs the application on the device 302. The device presents its login screen prompting the user to enter their numeric password 303. The device takes the SHA-512 hash of the numeric number password and validates it against the stored hash of the device 304. If the password is wrong, then a check is made to determine how many times login has been attempted 305. If the attempt is less than the number of allowed login failures 306, the user may try again, if it is more than the allowed number of failures, the user is notified that the application has been locked and is prompted for the unlock code 306. To unlock, a user must receive the device's unlock code from the server administrator. Once the code is received the user enters the correct unlock code 307, the device confirms the code and, if the number of unlock attempts has not been exceeded, prompts the user to re-enter their password. If the number of unlock attempts is exceeded the two factor authentication software on the device self-destructs. 308 If the device is lost or stolen and subsequently is used to attempt a login to the system, the system administrator may render the two factor authentication software on the device inoperable by sending the device the "self destruct" code of the device 304. If the correct password is entered by the user, the application generates two random numbers 309. The first random number (R1) is between 100 and 999. The second random number (R2) is between 0 and 500. The first random number generated (R1) is used to tell the device how many times to encrypt the key. The device then encrypts the key (R1) times using the device id key as the cryptographic material for the encryption 310. Next, a SHA-512 has a value that is calculated for the encrypted key and stored in the memory as "H1" 311. The hash value (H1) is moved to position R2 in the H1 string and the value read (H1)[(R2)] to (H1)[R2-6] and construct a sub-string using those six character values then referred to as S1 312. Finally, a constructed key is presented to the user 313 as follows. First convert R1 to a hex string using leading zeros so that length (R1)=3. Then convert R2 to a hex string using leasing zeros so that Length (R2)=3. Finally construct the key value (K1) as follows.

$$K1=H1[4]+R1[1]+H1[1]+R1[3]+H1[3]+R2[2]+H1[6]+R1[2]+H1[5]+R2[3]+H1[2]+R2[1].$$

On the server side 301, the server parses the key entered when the user submits their login credentials, retrieves the first random number known as R1, as well as the second random number known as R2. Next, the server 301 encrypts the key on file R1 times using the device id on file as the cryptographic key and takes the initial SHA-512 hash value H1 and replaces the current key with the key that has been encrypted R1 times. The SHA-512 hash value is then noted as (SH1) 315. The hash value is then taken and moved to position R2 in the hash string 316, which then reads (SH1)[R2] to (SH1)[R6-2] and compares (SH1) to (H1) 317. If SH1 equals H1 the process is done 318. If they do not equal, then the server checks to see if the maximum tries has been exceeded 319. If so, the account is locked 320, if not, the user is notified of the failure and allowed to retry 321.

Now referring to FIG. 4, the Device Resynchronization Flowchart is illustrated wherein the device 401 is set to a resynchronization mode 402. The server 403 stores the administrator account and an owner runs the server resynchronization process 404. The server 403 retrieves and decrypts the device's key archived from the database 405. The server 403, then generates a number between 1000 and 9999 406. This will be referred to as [SRN1]. The server generated random number ([SRN1]) is displayed to the user or administrator in the server's user interface 407. The archived key is encrypted [SRN1] number of times and the resulting number is stored as the active key in the database 408. The user enters [SRN1] into the device's user interface 409. The device 401 retrieves the archived initial key and decrypts it 410. The archived key is encrypted [SRN1] number of times. The resulting number is stored as the active key 411. The device returns to runtime mode 412.

The purpose of the multi level access control subsystem is to provide an intuitive means of describing any combination of classifications, categories or privilege requirements in order for a subject to be granted access to an object in the system.

During design time the user is presented with a graphical user interface that allows them to assemble the classifications, categories and privilege requirements of the object as well as the clearances, memberships and rights granted to the subject. At runtime, the subject's privileges are combined with the object's requirements to determine if the subject is allowed access to the object and what actions the subject may perform on the object.

Figure 5:
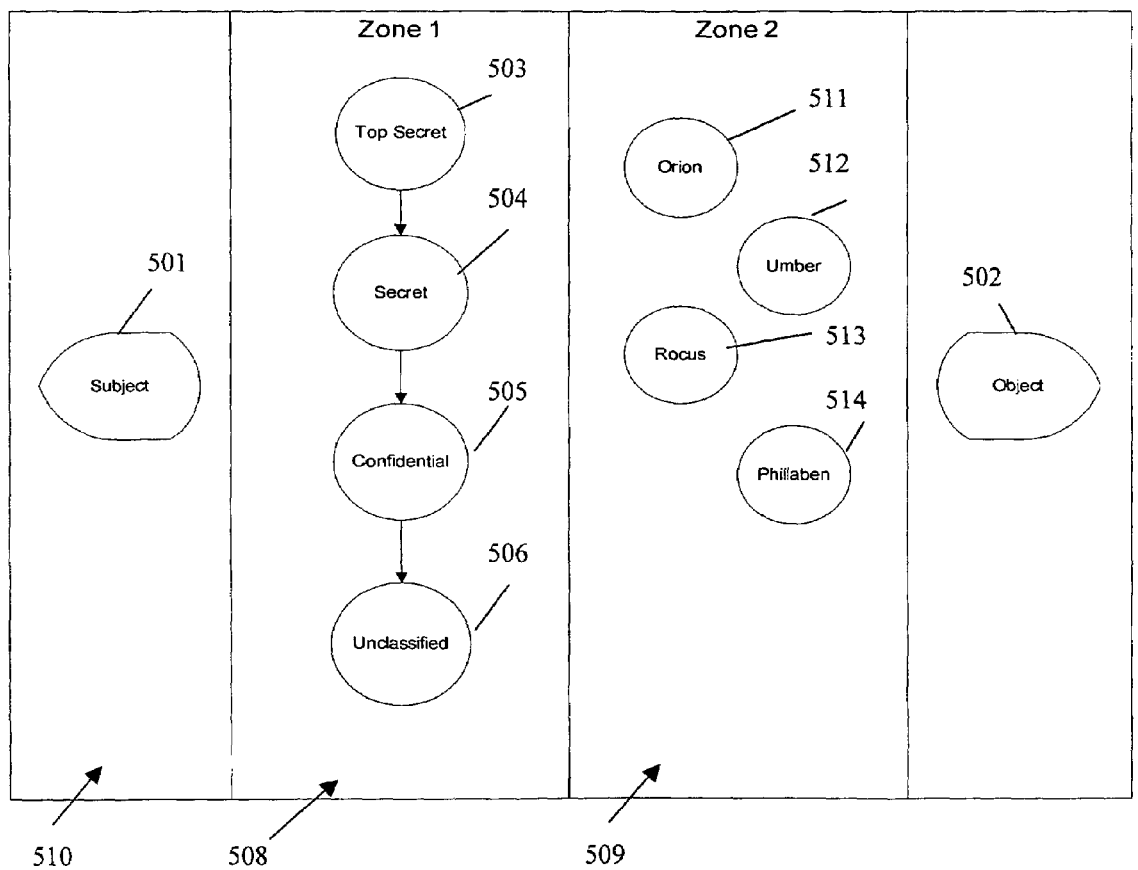
FIG. 5 is a graphical example of a multi level access control master map of the present invention.

The top most container of this design is called a master map 500 as graphically shown in FIG. 5. The master map 500 defines all the possible classifications, categories and privileges that exist between the subject 501 and object 502. The master map 500 also defines any default relationships that exist between classifications, categories and/or privileges. A good example of default relationships may be expressed in the federal government's categorization of classified information. There are four categories named Top Secret 503, Secret 504, Confidential 505, and Unclassified 506. A subject cleared for Top Secret information 503, by default, has permission to Secret 504, Confidential 505, and Unclassified information 506. To translate this example to the master map 500, the Top Secret node 503 would have a default connector to the Secret node 504, the secret node 504 would have a default connector to the confidential node 505, and the confidential node 505 would have a default connection to the unclassified node 506. These connectors are defined as one-way connectors, meaning that a subject with access to the Top Secret Node 503 would have access to the Secret node 504, but a subject with access to the Secret node 504 would not by default have access to the Top Secret node 503.

Figure 6:
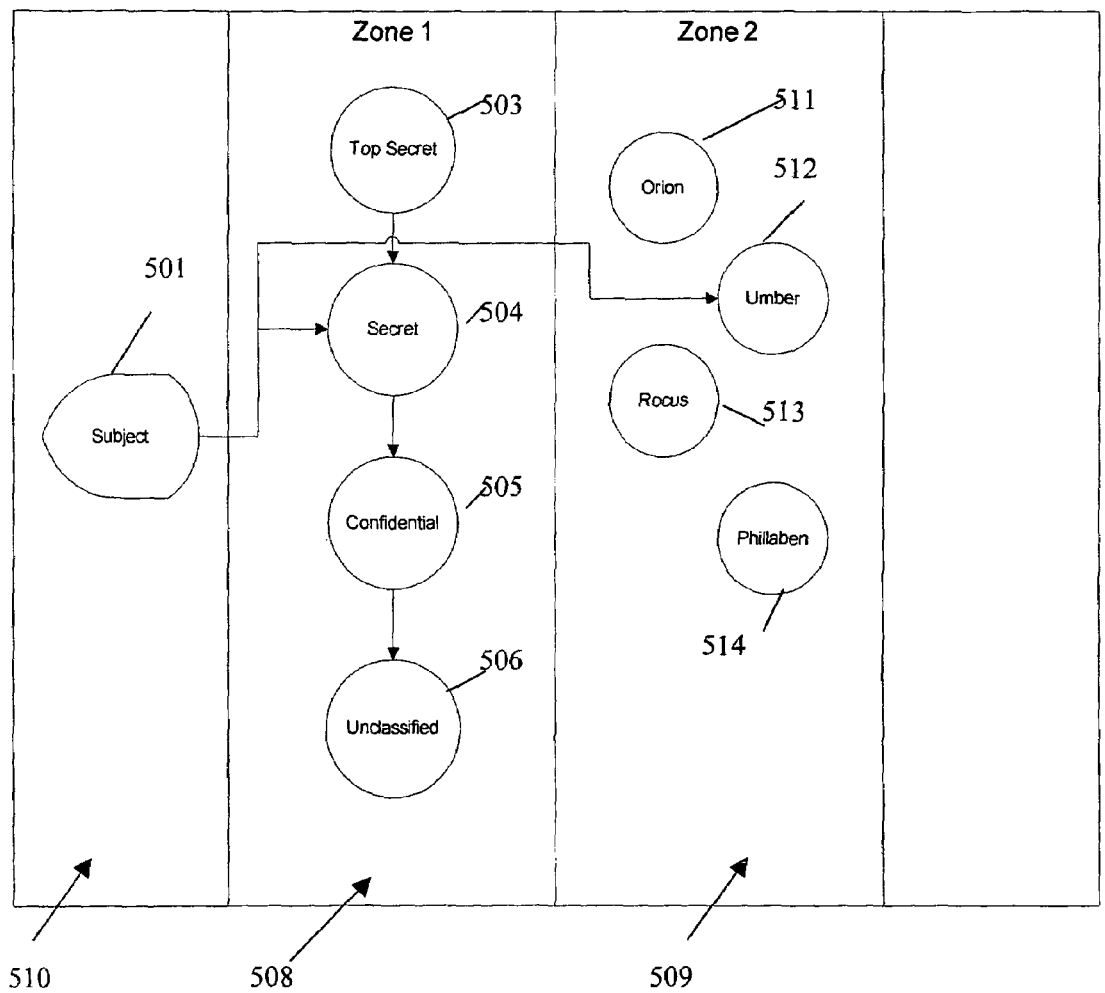
FIG. 6 is a graphical example of a multi level access control subject map of the present invention.
Figure 7:
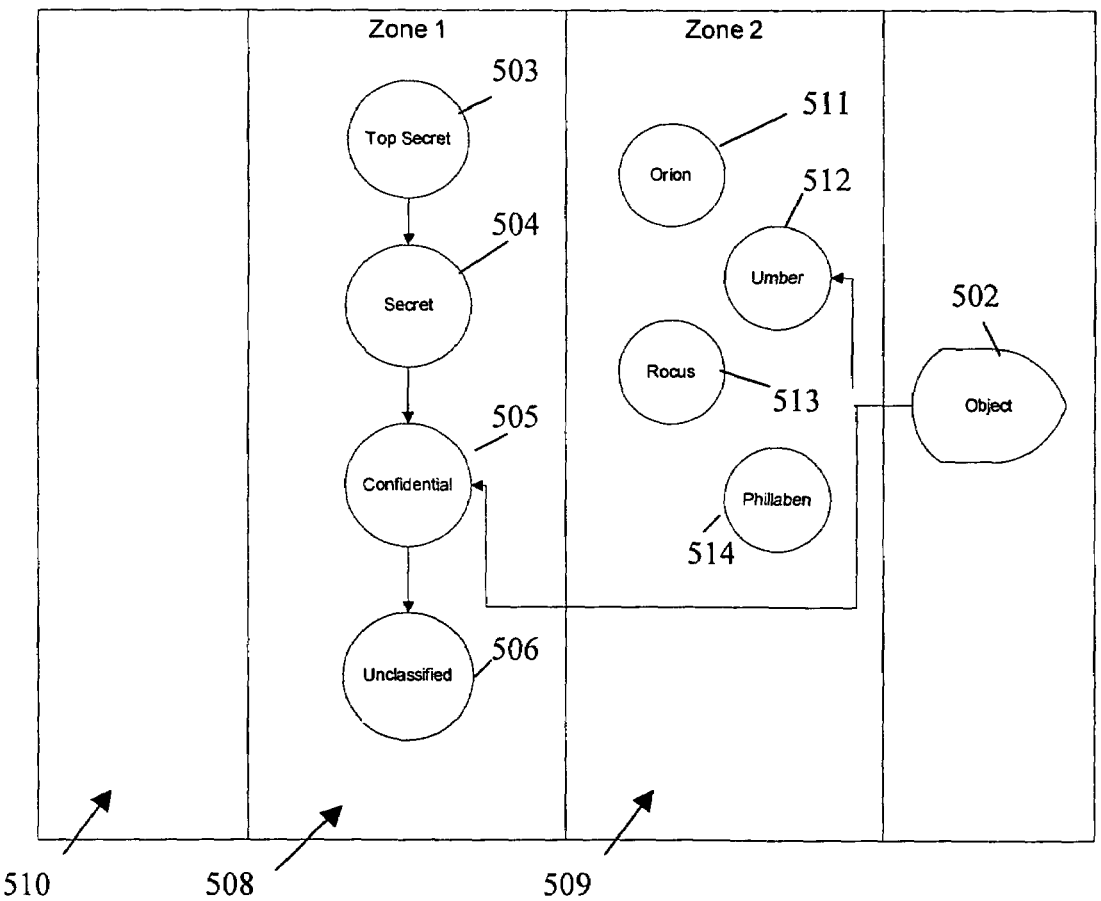
FIG. 7 is a graphical example of a multi level access control object map of the present invention.

Derived from the master map 500 are the subject map 600 and the object map 700 shown in FIGS. 6 and 7 respectfully. During design time an authorized user is able to define the privileges enjoyed by a subject as well as defining what an object requires in terms of privileges from a subject wishing to make use of the object.

The master map 500 container contains zones. A zone is defined as a group of related classifications, categories or privileges. To return to the federal government information categorization analogy, top-secret 503, secret 504, confidential 505 and unclassified nodes 506 would be entered into a zone 508. Some information that is classified may also have a compartment assigned to it where a subject must not only have authorization to the classification of the information (top secret, secret, etc), but also have been granted access to the compartment in which the information resides. To return to our zones analogy, a second zone 509 would be added to the master map 500 which would contain the various compartments that exist. Map enumerations for the compartments illustrated in the second zone 509 are Orion 511, Umber 512, Rocus 513, and Phillaben 514. Another zone 510 may be added that contains departments that a subject 501 must belong to in order to access the object 502. Ultimately a zone is an end-user defined group of classifications, categories or privileges.

A zone may also define entrance and exit conditions in order to transit into or out of that zone. A simple analogy might be for a subject to have a defense security service background check to enter into the classification zone in order shorten processing time required at runtime to determine a subject's access rights to an object.

Once a map is completed it is then compiled into a series of data structures that will allow for rapid runtime determination of access rights.

The map itself is compiled into a hash table where the key is defined as the zone identifier and the value is defined as an array of long unsigned integers. The number of arrays needed to store each node in the zone is defined as:

$$\frac{\text{Number of nodes in the zone}}{\log_2(\text{sizeof}(\text{unsigned long}))}$$

On a 32-bit computer the size of a log base 2 of an unsigned long this is 32, so on such a machine the nodes will be arranged into groups of 32.

The end result of the compilation is a set of two-dimensional array of bits. One array represents the subject's permissions as shown in FIG. 6 and the other array represents the object's requirements as shown in FIG. 7. Within the subject array a one represents permission to a specific requirement and a zero represents denial of a specific requirement. Within the subject array a one represents a requirement that the subject must fulfill in order to gain access to the object and a zero represents a requirement which the object does not care one way or the other about.

When a user logs into the system, their map is retrieved from persistent storage and placed into the hash table in memory, and is unloaded when the user logs out. When a subject requests access to an object the subject's compiled map is looked up along with the object map. Each of the groups in the two compiled maps are compared with one another using a "binary and" method. If the object map value equals the result of the "binary and" method for all groups then the subject has permissions to the object. If the object map value does not equal the result of the "binary and" method for all groups then the subject does not have access to the object. For example, in the subject map of FIG. 6, the zone enumeration values for zone 1 508 are 0, 1, 1, 1 allowing access by the subject to Secret 504, Confidential 505, and Unclassified 506 nodes. The zone enumeration values for zone 2 509 are 0, 1, 0, 0 allowing access only to Umber 512. In the object map of FIG. 7, the zone enumeration values for zone 1 508 are 0, 0, 1, 1 allowing access by the object to Confidential 505 and Unclassified 506 nodes only. The zone enumeration values for zone 2 509 are 0, 1, 0, 0 allowing access only to Umber 512.

The Runtime calculation shown in Table 1 illustrates a Zone 1 comparison for determining whether the zone 1 binary and sum equal the object map zone 1 value. This table illustrates that, yes, there is permission through zone 1.

TABLE 1

| Subject map zone 1 value | 0 | 1 | 1 | 1 |
| Object map zone 1 value | 0 | 0 | 1 | 1 |
| {binary and} | 0 | 0 | 1 | 1 |

The Runtime calculation shown in Table 2 illustrates a Zone 2 comparison for determining whether the zone 2 binary and sum equal the object map zone 2 value. This table illustrates that, yes, there is permission through all zone and that the subject has access rights to the object.

TABLE 2

| Subject map zone 1 value | 0 | 1 | 0 | 0 |
| Object map zone 1 value | 0 | 1 | 0 | 1 |
| {binary and} | 0 | 1 | 0 | 0 |

Figure 8:
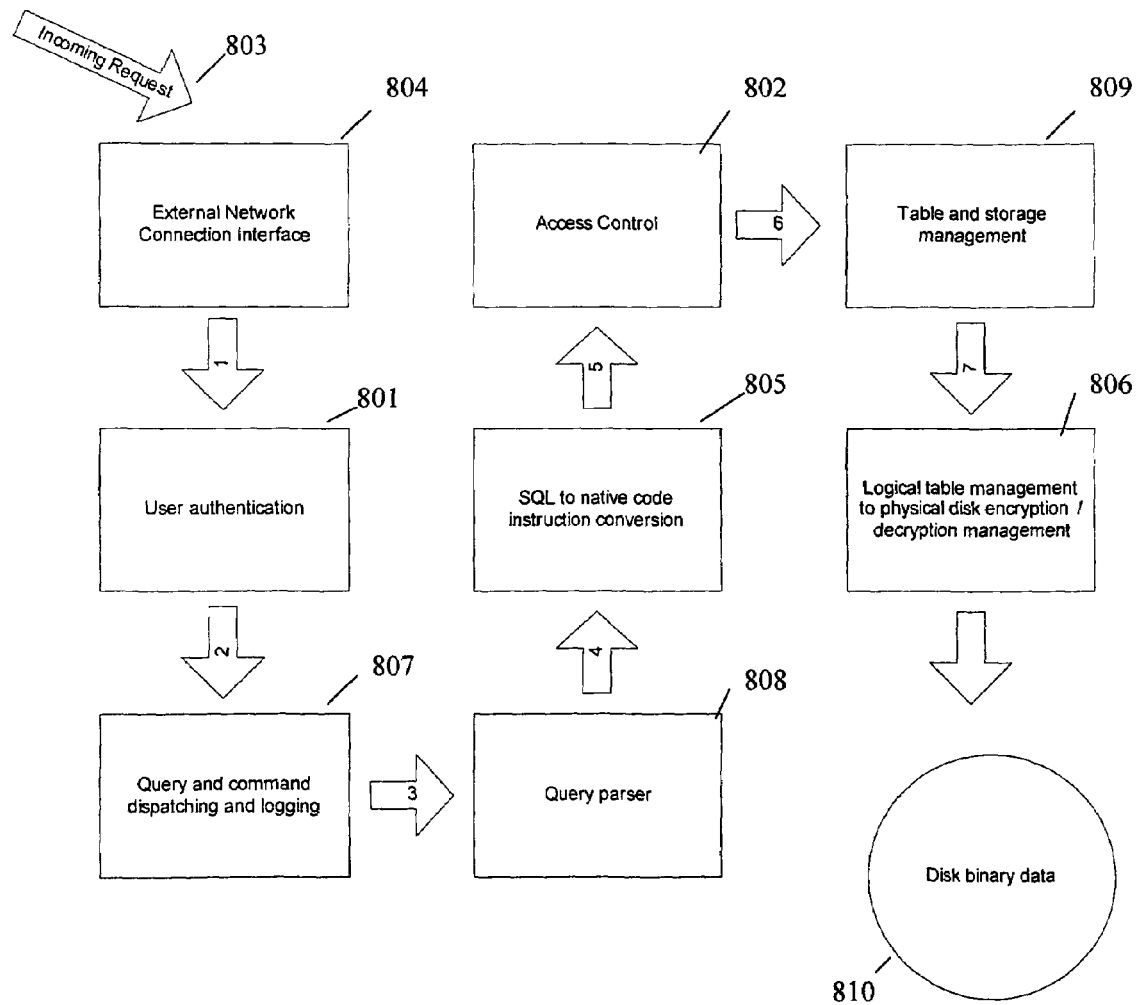
FIG. 8 is a flow chart of the database of the present invention.

Most databases have, at least, a similar flow to that flow which is outlined in FIG. 8. The present invention is found within three modules as shown in FIG. 8. The user authentication module 801 accepts the standard username and password as an incoming request 803, but also accepts, along with the username and password, a piece of cryptographic data that is signed with a private user key—and thus can be authenticated with the user's public key on the database—as well as machine data through an external network connection interface 804. Upon user authentication 801, query and command dispatching and logging occurs 807 wherein that information is then sent to a query parser 808 to be processed in the SQL to native instruction conversion module 805.

The database access control module 802 interfaces with the access control graph detailed in this document to enable the database to only show that data to which the user has access. This control is granular down to the cell level (a specific column in a specific row). In order to enable the database system to know what protection is afforded to different tables, columns, rows, or cells in a database there are additional functions added to the set of existing SQL functions to allow specification of required access rights for a database, table, column, row, and/or cell. These additional functions and their meanings are processed in the SQL to native instruction conversion module 805 before being sent to the access control module 802 and then processed for by a table and storage management module 809.

The final module is the data encryption and validation module 806. This is a new module addition to a DBMS. The data encryption and validation module 806 is responsible for taking unencrypted data from the table and storage management module 8098 in use by the DBMS and writing it to a disk in a strongly encrypted fashion, as well as reading encrypted data from the disk 810, ensuring that the data has not been altered, and decrypting the data for the DBMS to use.

Figure 9:
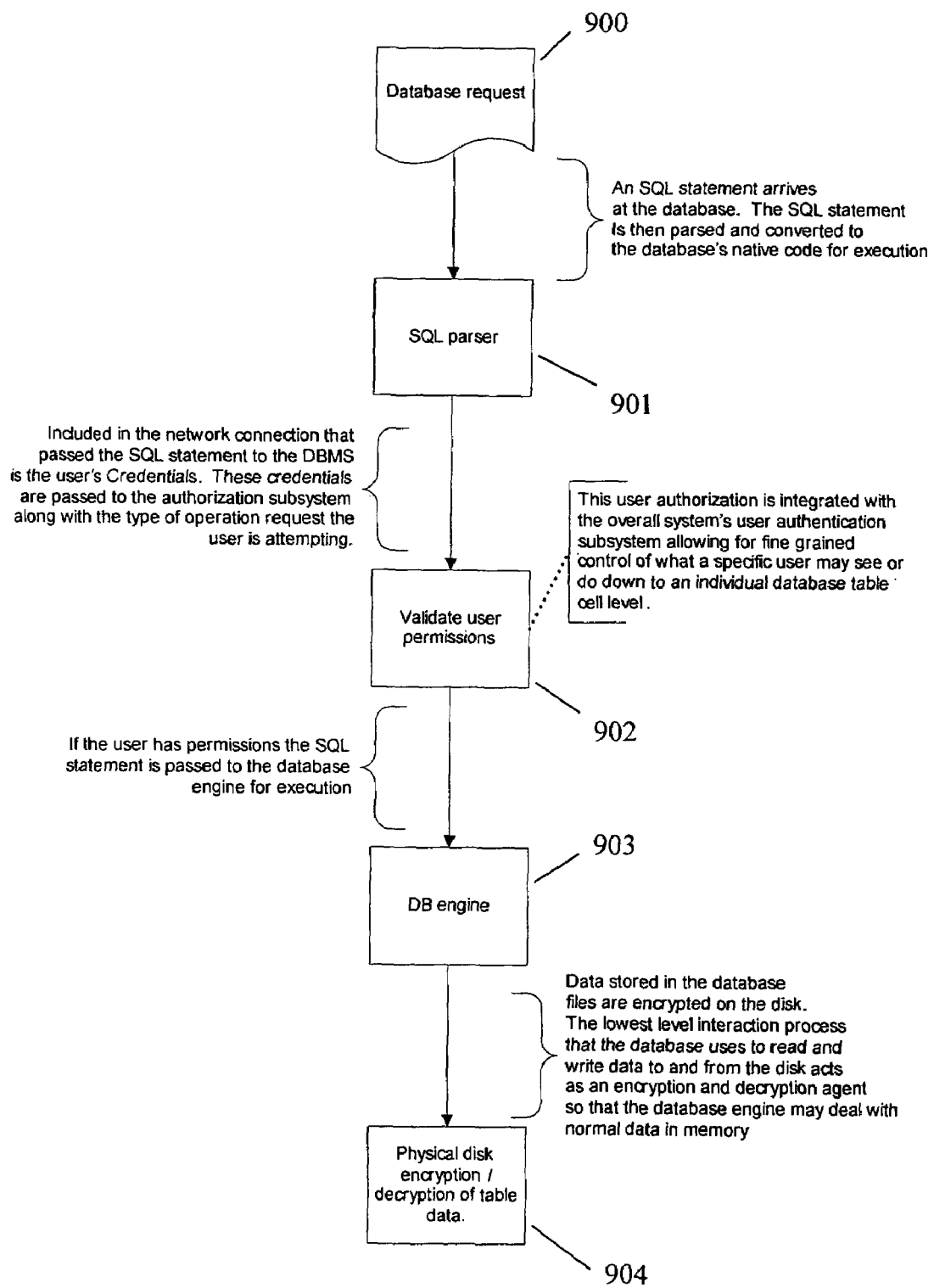
FIG. 9 is a flow chart of the database request process of the present invention.

Now referring to FIG. 9, the a database request 900 starts when an SQL statement arrives at the database. The SQL statement is then parsed and converted to the database's native code for execution by the SQL parser 901. Included in the network connection that passes the SQL statement to the DBMS is the user's credentials. These credentials are passed to the authorization subsystem along with the type of operation request the user is attempting. User permissions are then validated 902. This user authorization is integrated with the overall system's user authentication subsystem allowing for fine grained control of what a specific user may see or do down to an individual database table cell level. If the user has permissions, the SQL statement is passed to the database engine 903 for execution. Data stored in the database files are encrypted on the disk 904. The lowest level interaction process that the database uses to read and write data to and from the disk acts as an encryption and decryption agent so that the database engine 903 may deal with normal data in memory.

It is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A security enhanced data platform method comprising the steps of:
   providing a computer operating system;
   customizing computer operating system's kernel;
   replacing the computer operating system's kernel and core utilities with a multi-level access control system;
   providing an email and messaging server as a host for sending and receiving messages;
   allowing automation of email retention in compliance with a document retention policy;
   providing a primary subsystem;
      said primary subsystem is a document management system;
         providing a set of client side tools to specify classifications and compartments for selected areas of a document;
         separating document data from document metadata;
         allowing encrypted documents to be stored and information about those documents to be stored in a database;
         allowing for quick look up and access of secured documents;
         providing a way to save the document in format required by the primary subsystem in order to allow the primary subsystem to enforce rules and privileges dictated to the primary subsystem;
         monitoring and recording all activity within the primary subsystem;
         recording all changes to the document and making said changes available for audit;
   providing one or more supporting subsystems;
      a first subsystem is a security enhanced database management system;
         integrating said security enhanced database management system with the multi-level access control system;
         securing data in the database as a whole including securing tables in the database, the columns in the tables, the rows in the tables, or the individual cells of the tables;
      a second subsystem is a user authentication and authorization system;
         offering native enhanced security by enforcing privileges specified by the user authentication and authorization system;
         performing setup for a device including:
            logging in and setting up a user account on the email and messaging server;
            placing the user account in a device set up mode;
            said email and messaging server generating a five-digit number and presenting it on a user interface;
            said email and messaging server generating and storing a device unlock code;
            said email and messaging server generating and storing a key;
            placing the device into a setup mode;
            said device receiving a numeric password from a user;
            encrypting the numeric password using the device identifier (ID);
            computing SHA-512 hash value of the encrypted password and storing the hash value on the device;
            prompting user to enter the five-digit number provided by the email and messaging server;
            connecting the device to the email and messaging server via Wireless Application Protocol (WAP) or desktop synchronization software;
            sending the email and messaging server the entered five-digit number and the device ID;
            looking up the five-digit number and accepting the device ID by the email and messaging server;
            upon acceptance of the five-digit number, the email and messaging server storing the device ID for the user account;
            encrypting the key using the device ID and sending the encrypted key to the device;
            storing the encrypted key as an active key and as an archive of the original key by the device;
            encrypting the unlock code using the device ID and then computing SHA-512 hash value of the encrypted unlock code;
            sending the hash value of the encrypted unlock code to the device;
            storing the received hash value of the encrypted unlock code by the device;

generating a device specific self-destruct code by the email and messaging server, and encrypting the device specific self-destruct code using the device ID;

computing SHA-512 hash value of the encrypted device specific self-destruct code by the email and messaging server;

sending the SHA-512 hash value of the encrypted device specific self-destruct code to the device;

storing the SHA-512 hash value of the encrypted device specific self-destruct code by the device; and retrieving a permanent lock count from a configuration database by the device; encrypting the permanent lock count using the device ID and sending the SHA-512 hash value of the encrypted unlock code to the email and messaging server; and storing the SHA-512 hash value of the encrypted unlock code on the device;

a third subsystem is a workflow engine;

providing a runtime workflow engine used to route documents and data through a user defined approval process for actions on the documents or data;

a fourth subsystem is a secure two-factor authentication subsystem;

providing a secure two-factor authentication mechanism adding an additional authentication mechanism;

running a computer application on the device;

presenting a login screen on the device and prompting user to enter numeric password;

computing SHA-512 hash value of the numeric password and validating the computed SHA-512 hash value of the numeric password against stored hash value on the device;

in response to wrong password inputted, a check is made to determine how many times login has been attempted;

if the attempt is greater than the number of allowed login failures, the user is notified that the application has been locked and is prompted for the unlock code;

a fifth subsystem is a cryptographic engine; and providing data protection, data authentication, user authentication and vetting, and communications protection and authentication.

2. The method of claim 1, further comprising the steps of:
enabling authentication and authorization with a set of tools that can be configured by a system administrator;
providing a configurable password requirement including minimum length, required usage of capital and lower case letters, numbers, and symbols; and
requiring user rights authorization of any combination of requirements set by the system administrator via the user authentication and authorization system.

3. The method of claim 1, further comprising the steps of:
encrypting internal data storage before writing to disk;
enveloping and making part of the logical file system, new disks or other storage media added to the systems.

4. The method of claim 1, further comprising the steps of:
allowing a user to have different user privilege requirements on a document as a whole as well as on a granular level on pages, paragraphs, sentences, words, and/or letters of a word; and
automatically redacting the data for which the user does not have privileges as well as enforcing granular control of what users may edit, delete, create, or alter.

5. The method of claim 1, further comprising the step of:
maintaining a history of document changes to provide an audit trail after the fact of who did what changes, where those changes were made, and when those changes were made; and
authenticating audit trail users by account username and password login.

6. The method of claim 1, further comprising the step of:
providing a two-factor authentication system with which to allow users to login.

7. The method of claim 1 wherein, the secure two factor authentication sub-system uses an existing cell phone or PDA to securely produce a one time password.

8. The method of claim 1, further comprising the steps of the runtime operations flow wherein if the password is wrong;
checking to determine how many times it has been attempted;
if the attempt is less than the number allowed, trying again;
if the attempt is more than the allowed number of failures, providing a notification that the application has been locked and prompted for an unlock code;
entering a correct code unlock code;
confirming the code and prompting the user to re-enter the password if the number of unlock attempts has not been exceeded;
if the number of unlock attempts is exceeded the device self destructs by receiving a self destruct password for the device from the stored hash of the device;
if the correct password is entered, two random numbers are generated;
the first random number (R1) is between 100 and 999;
the second random number (R2) is between 0 and 500;
the first random number generated (R1) is used to tell the device how many times to encrypt the key;
the device then encrypts the key (R1) times using the device id key as the encryption;
a SHA-512 has value is calculated for the encrypted key and stored in the memory as "H1";
the hash value (H1) is moved to position R2 in the H1 string and the value reads (H1)[(R2)] to (H1)[R2-6] and constructs a sub-string using those six character values then referred to as S11
a construct key is then presented to the user.

9. The method of claim 8, wherein the construct key value is determined by;
converting R1 to a hex string using leading zeros so that length (R1)=3;
converting R2 to a hex string using leasing zeros so that Length (R2)=3; and
constructing the key value (K1) as K1=H1[4]+R1[1]+H1[1]+R1[3]+H1[3]+R2[2]+H1[6]+R1[2]+H1[5]+R2[3]+H1[2]+R2[1].K1=H1[4]+R1[1]+H1[1]+R1[3]+H1[3]+R2[2]+H1[6]+R1[2]+H1[5]+R2[3]+H1[2]+R2[1].

10. The method of claim 1, further comprising the steps of device resynchronization;
setting the device to a resynchronization mode;
accessing administrator account on the email and messaging server and running a server resynchronization process;
retrieving and decrypting a device's key archived from the database by the email and messaging server;
generating a number between 1000 and 9999 by the email and messaging server referred to as SRN1;
displayed SRN1 to the user or administrator in a server's user interface;

encrypting the archived device's key SRN1 number of times where the resulting number is stored as the active key in the database;
entering SRN1 into the device's user interface;
retrieving the archived initial key and decrypting the archived initial key by the device;
encrypting the archived key SRN1 number of times and storing the encrypted archived key as the active key; and
returning the device to runtime mode.

11. The method of claim 1, further comprising the steps of:
presenting the user with a graphical user interface that allows the user to assemble classifications, categories and privilege requirements of an object as well as clearances, memberships and rights granted to a subject;
combining, at runtime, the clearances, memberships and rights granted to the subject with the object's requirements to determine if the subject is allowed access to the object and what actions the subject may perform on the object.

12. The method of claim 11, further comprising the steps of:
creating a master map which defines all the possible classifications, categories and privileges that exist between the subject and object;
defining, by the master map, any default relationships that exist between classifications, categories and/or privileges;
creating a subject map define the privileges granted to the subject; and
creating an object map defining requirements in terms of privileges from the subject wishing to make use of the object.

13. The method of claim 12, wherein the master map contains a plurality of zones defining a group of related classifications, categories or privileges; and
information that is classified also have a compartment assigned to the information where a subject must not only have authorization to the classified information but also have been granted access to the compartment in which the information resides.

14. The method of claim 12, wherein a zone also defines entrance and exit conditions in order to transit into or out of that zone.

15. The method of claim 12, further comprising the steps of:
once a map is completed, compiling into a series of data structures that will allow for rapid runtime determination of access rights;
compiling the map into a hash table where the key is defined as zone identifier and a value is defined as an array of long unsigned integers;
calculating a set of two-dimensional array of bits where one array represents subject's permissions and the other array represents object's requirements;
within the subject's permission array, a one represents permission to a specific requirement and a zero represents denial of a specific requirement; and
within the subject's permission array, a one represents a requirement that the subject must fulfill in order to gain access to the object and a zero represents a requirement which the object does not care one way or the other about.

16. The method of claim 15, further comprising the steps of;
logging a user into the system;
retrieving a user map from persistent storage and placing the map into the hash table in memory, and unloading said map when the user logs out;
requesting access by a subject to an object
looking up the subject's compiled map along with the object map;
comparing each of the groups in the two compiled maps with one another using a "binary and" method;
if the object map value equals the result of the binary and method for all groups then the subject has permissions to the object; and
if the object map value does not equal the result of the "binary and" method for all groups then the subject does not have access to the object.

17. The method of claim 1, further comprising the steps of:
providing a user authentication module that accepts the standard username and password as an incoming request and a piece of cryptographic data that is signed with a private key of the user;
providing an access control module that interfaces with access control graph detailed to enable the database to only show data to which the user has access;
providing control down to the cell level;
providing a data encryption and validation module responsible for taking unencrypted data from the table a storage management module and writing the unencrypted data to a disk in encrypted form, as well as reading encrypted data from the disk, ensuring that the data has not been altered, and decrypting the data for use.

18. The method of claim 17, further comprising the steps of:
starting a database request when an SQL statement arrives at a database server;
parsing and converting the SQL statement to a database's native code for execution by an SQL parser;
including in the network connection that passes the SQL statement to the database server is the user's credentials;
said credentials are passed to the authorization subsystem along with the type of operation request the user is attempting;
validating user permissions;
integrating this user authorization with the user authentication and authorization subsystem allowing for fine grained control of what the user may see or do down to an individual database table cell level;
if the user has permissions, passing the SQL statement to the database server for execution and encrypting data stored in the database files on the disk; and
providing lowest level interaction process to the database server for reading and writing data to and from the disk, said interaction process acts as an encryption and decryption agent allowing the database server to process data in memory.

* * * * *